United States Patent [19]
Honjo et al.

[11] Patent Number: 5,949,937
[45] Date of Patent: *Sep. 7, 1999

[54] OPTICAL CONNECTOR

[75] Inventors: Makoto Honjo; Hiroshi Katsura; Yoshikyo Tamekuni; Toru Yamanishi, all of Kanagawa; Shinji Nagasawa, Ibaraki, all of Japan

[73] Assignees: Sumitomo Electric Industries, Ltd., Osaka; Nippon Telegraph and Telephone Corporation, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/608,458

[22] Filed: Feb. 28, 1996

[30] Foreign Application Priority Data

Feb. 28, 1995 [JP] Japan ..................................... 7-40943

[51] Int. Cl.⁶ ...................................................... G02B 6/38
[52] U.S. Cl. ................................................. 385/59; 385/60
[58] Field of Search ........................... 385/55–65, 76–83, 385/88, 89, 90, 91, 92

[56] References Cited

U.S. PATENT DOCUMENTS

| | | | |
|---|---|---|---|
| 5,121,454 | 6/1992 | Iwano et al. | 385/60 |
| 5,163,107 | 11/1992 | Garriss | 385/74 |
| 5,555,332 | 9/1996 | Dean et al. | 385/53 |
| 5,602,951 | 2/1997 | Shiota et al. | 385/81 |
| 5,664,039 | 9/1997 | Grinderslev et al. | 385/65 |

FOREIGN PATENT DOCUMENTS 0 271 721   6/1988   European Pat. Off. .
2-205809    8/1990   Japan .

OTHER PUBLICATIONS

Patent Abstracts of Japan, vol. 013, No. 424 (P–934), Sep. 21, 1989 & JP–A–01 155305 (Sumitomo Electric Ind Ltd), Jun. 19, 1989.
Patent Abstracts of Japan, vol. 018, No. 373 (P–1769), Jul. 13, 1994 & JP–A–06 102435 (Furukawa Electric Co Ltd: The: Others: 01), Apr. 15, 1994.
Satake et al, "Very Small Single–Mode Ten–Fiber Connector", Journal of Lightwave Technology, vol. 6, No. 2, Feb. 1988, pp. 269–272.

*Primary Examiner*—Hung N. Ngo
*Attorney, Agent, or Firm*—Pillsbury Madison & Sutro LLP

[57] ABSTRACT

An optical connector according to the present invention is comprised of a ferrule having at least one optical fiber and a plurality of guide holes, and a plurality of guide pins each being inserted in each of the holes. The guide pin is capable of being attached into and detached from the hole. At least one of an inner diameter of the guide hole and an outer diameter of the guide pin change the longitudinal direction thereof, and at least a part of the guide pin is in contact with the guide hole.

8 Claims, 3 Drawing Sheets

OPTICAL CONNECTOR

BACKGROUND OF THE INVENTION

1. Field of the Invention

The present invention relates to so-called fit plug type optical connectors in which optical coupling is performed through guide pins.

2. Description of the Related Art

Heretofore, MF optical connectors and MT optical connectors are known as conventional optical connectors having guide holes. Such optical connectors provide optical coupling in a manner that guide pins are inserted into guide holes of respective optical connectors and optical fibers are made to abut on each other at their end surfaces while positioning the optical connectors.

In such a conventional optical connector, however, the inner diameter of a guide hole is generally formed so as to be slightly larger (about 1 to 3 $\mu$m) than the diameter of a guide pin in order to facilitate an attaching/detaching operation. As a result, the optical connector may move by a clearance defined between the inner diameter of the guide hole and the outer diameter of the guide pin when the optical connector is coupled with another optical connector. This presents a problem in that coupling loss varies at the time of attachment/detachment of the optical connectors.

For example, if there is a displacement by 1 $\mu$m in a direction perpendicular to the axial line of the optical fibers when optical connectors having a coupling loss of 0.2 dB are coupled with each other, the coupling loss increases to about 0.8 dB.

Further, when a ferrule is produced by molding with a plastic material, the guide holes cannot be always straight and may be curved because of the unevenness of shrinkage, the warp, or the like, of the molding material. In such a case, the position in which the guide pin is in contact with the guide pin varies correspondingly to the individual ferrule. This presents a problem in that the fitting state of the guide pin is varied rather than fixed.

Furthermore, the position at which the guide pin is located with respect to the guide hole in the longitudinal direction is not fixed, thereby allowing the coupling state of the connectors to vary correspondingly to the location of the guide pin.

SUMMARY OF THE INVENTION

It is an object of the present invention is to provide an optical connector with no variation of coupling loss at the time of attachment/detachment of the optical connectors.

An optical connector according to the present invention is comprised of a ferrule having at least one optical fiber and a plurality of guide holes. A plurality of guide pins are each inserted in each of the holes. The guide pin is capable of being inserted into and extracted from the hole. At least one of an inner diameter of the guide hole and an outer diameter of the guide pin change the longitudinal direction thereof. At least a part of the guide pin is in contact with the guide hole.

In the optical connectors according to the present invention, the problem of the increase of optical loss caused by the displacement of the axes of the optical fibers at the time of coupling of the optical connectors does not occur because the guide pins are always accurately held in predetermined positions with respect to the guide holes. Extraction and insertion of the guide pins can be smoothly performed because each of the guide pins is held only at one portion thereof.

BRIEF DESCRIPTION OF THE DRAWINGS

In the accompanying drawings.

PREFERRED EMBODIMENTS OF THE INVENTION

Preferred embodiments of an optical connector according to the present invention will be described below in detail with reference to the accompanying drawings.

Figure 1:
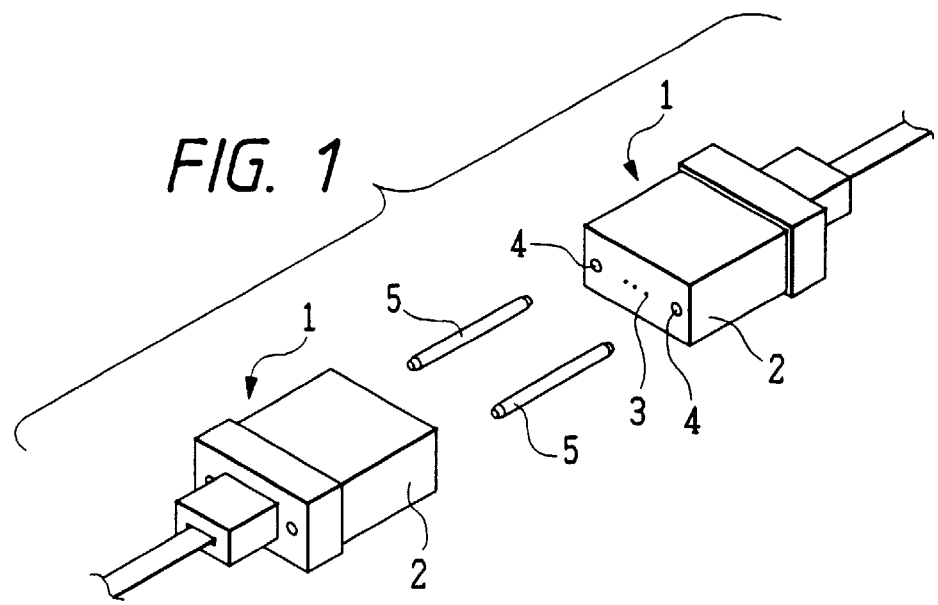
FIG. 1 is a perspective view showing the outline of optical connectors to which the present invention is applied.

FIG. 1 shows the outline of MT optical connectors as exemplary optical connectors to which the present invention is applied.

In each of optical connectors 1, a group of optical fibers 3 are embedded in a ferrule 2 thereof so as to be arranged laterally in parallel with each other at intervals of an equal distance. Incidentally, it is contemplated that there may be only one optical fiber. On opposite sides in the direction of arrangement of the optical fiber group 3, two guide holes 4 are provided substantially in parallel to the center axis line of the optical fiber group 3 and in positions separated at an equal distance from the center axis line of the optical fiber group 3 so as to pierce the optical connector 1. The reference numeral 5 designates guide pins which are fitted into guide holes 4 of the optical connectors 1 coupled with each other.

Incidentally, the center axis line of the optical fiber group 3 used herein means a line which is located in the middle of two center ones of the optical fibers of the optical fiber group 3 when the optical fiber group 3 is constituted by an even number of optical fibers, and which is coincident with the center axis line of the center one of the optical fibers when the optical fiber group 3 is constituted by an odd number of optical fibers.

Further, because a pair of ferrules 2 to be coupled with each other have the same shape and are symmetric with respect to the connector end surface, only one side will be described below in order to make understanding easy.

Figure 2:
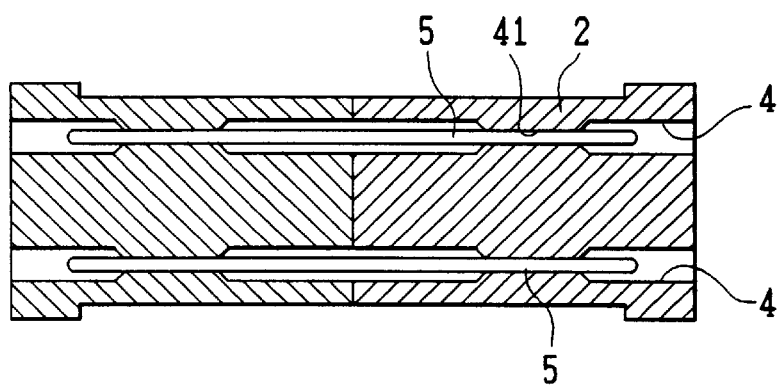
FIG. 2 is a sectional view showing a first embodiment of the present invention.

Incidentally, illustration of the optical fibers 3 are omitted in embodiments shown in FIG. 2 et seq. for the sake of simplification of the drawing. The shapes of the guide hole and guide pin are shown in an exaggerated manner in order to make understanding easy.

In a first embodiment of the present invention, as shown in FIG. 2, the inner diameter of each of the guide holes 4 is changed along the longitudinal direction thereof and a minimum portion 41 is formed substantially in the center portion. Each of the guide pins 5 is a straight pin the diameter of which is not changed along the longitudinal direction thereof.

Figure 3:
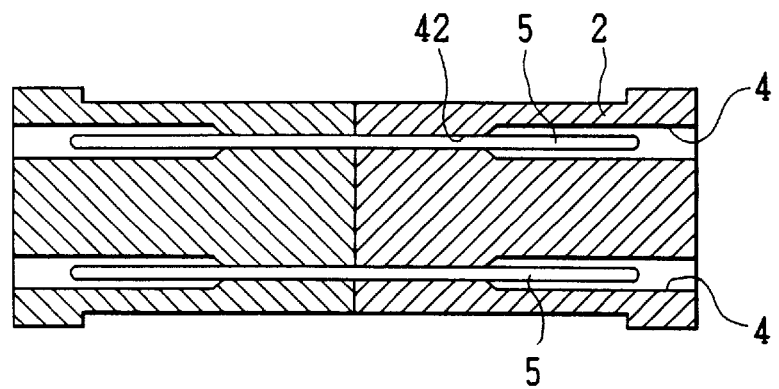
FIG. 3 is a sectional view showing a second embodiment of the present invention.

Further, in a second embodiment of the present invention shown in FIG. 3, the minimum inner diameter portion 42 of the guide hole 4 is formed on the connector end surface side.

The ferrule 2 is generally formed through transfer molding with a plastic material such as an epoxy resin, or the like, and the guide pin 5 is formed of stainless steel, or the like.

Figure 4:
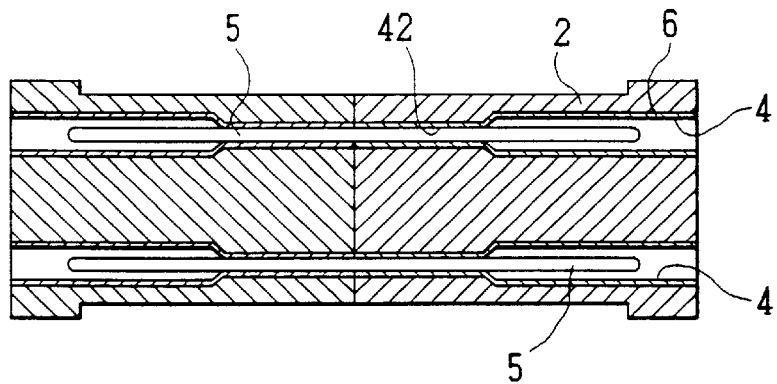
FIG. 4 is a sectional view showing a third embodiment of the present invention.

The basic shape of the guide pin 4 in a third embodiment of the present invention shown in FIG. 4 is the same as that in the second embodiment of the present invention, except that the guide hole 4 having the minimum inner diameter portion 42 on the connector end surface side is formed in a cylindrical member 6 made of ceramics such as zirconia, or the like, and that the cylindrical member 6 is formed so as to be embedded in the ferrule 2 in the aforementioned molding process.

In the first to third embodiments, the ratio of the length of the small diameter portion or minimum inner diameter portion is in the range of from 20% to 70%, more preferable in the range of from 35% to 65%, based on the whole length of the ferrule. If the ratio is less than 20%, the contact area is so small that an effect for holding the guide pin is lost. Accordingly, the optical axis of the optical fiber may be shifted at the time of optical coupling. On the other hand, If the ratio is more than 70%, the contact area is so large that the guide pin is influenced by curve of the guide hole, variation of the diameter of the guide hole or the like. Consequently, it is difficult to reduce the variation of coupling loss at the time of attachment/detachment of the optical connectors.

Figure 5:
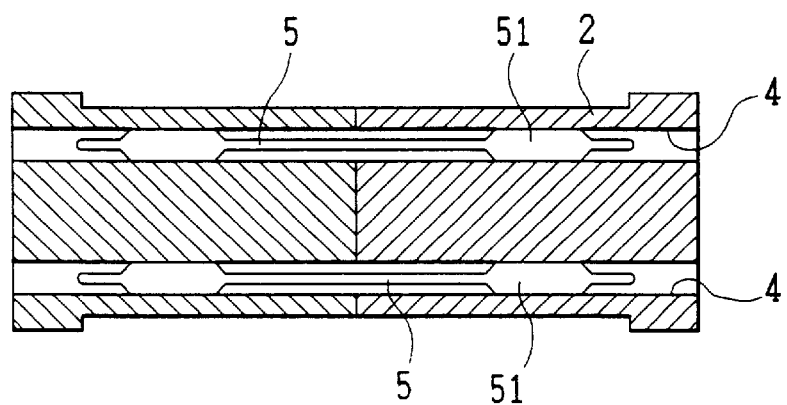
FIG. 5 is a sectional view showing a fourth embodiment of the present invention.

A fourth embodiment of the present invention is shown in FIG. 5. In this embodiment, the guide hole 4 is a straight hole without any change in its diameter whereas the outer diameter of the guide pin 5 is changed in the longitudinal direction thereof and maximum portions 51 are formed near opposite end portions thereof, respectively.

Figure 6:
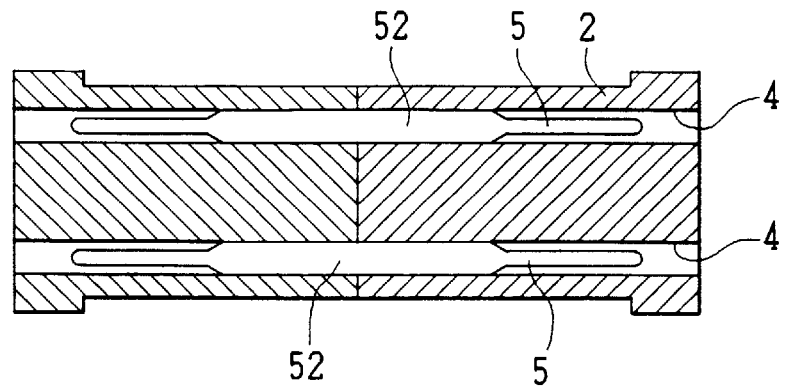
FIG. 6 is a sectional view showing a fifth embodiment of the present invention.

Further, in a fifth embodiment of the present invention shown in FIG. 6, the guide hole 4 has no change in its diameter, and a maximum portion 52 of the guide pin 5 is formed in the longitudinally center portion thereof, that is, near the connector end surface.

In the fourth and fifth embodiments, the ratio of the length of the maximum portion of the guide pin is in the range of from 20% to 70%, more preferable in the range of from 35% to 65%, based on the whole length of the ferrule.

In the following, sixth, seventh and eighth embodiments of the present invention will be described with reference to FIGS. 7 through 9, respectively. The above-mentioned embodiments shows the case where either the guide hole 4 or the guide pin 5 has a diameter which is not changed whereas these sixth, seventh and eighth embodiments show the case where a change of diameter is given to both of the guide hole 4 and the guide pin 5 so that the positioning of the guide pin in the longitudinal direction thereof is attained by using a level difference portion between the guide hole 4 and the guide pin 5.

Figure 7:
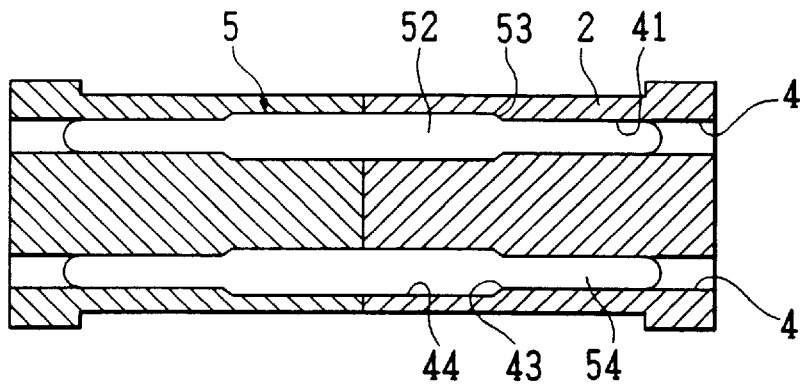
FIG. 7 is a sectional view showing a sixth embodiment of the present invention.

In the sixth embodiment shown in FIG. 7, a maximum outer diameter portion 52 is formed in the center portion of the guide pin 5 so that a level difference portion 53 between the maximum outer diameter portion 52 and a small diameter portion 54 of the guide pin 5 abuts on a level difference portion 43 between a small diameter portion 41 of the guide hole 4 and a large diameter portion 44 of the same. Further, the maximum outer diameter portion 52 of the guide pin 5 and the small diameter portion 54 of the same are in contact with the large diameter portion 44 of the guide hole 4 and the small diameter portion 41 of the same, respectively.

Figure 8:
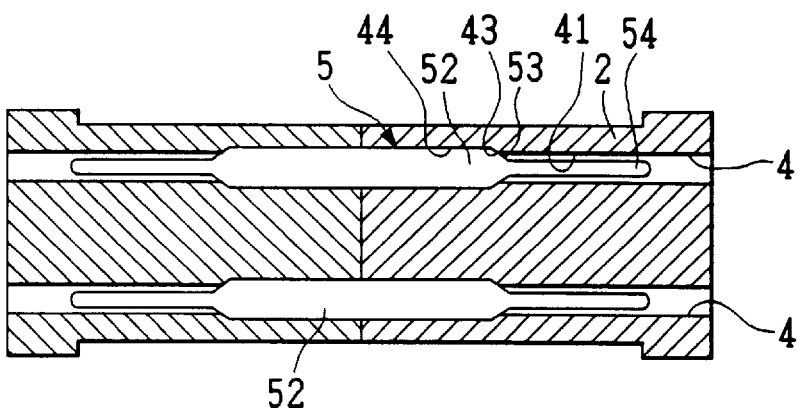
FIG. 8 is a sectional view showing a seventh embodiment of the present invention.

Further, the seventh embodiment of the present invention shown in FIG. 8 is the same as the sixth embodiment thereof, except that the small diameter portion 54 of the guide pin 5 is further reduced so as not to be in contact with the small diameter portion 41 of the guide hole on the contrary with the sixth embodiment.

Figure 9:
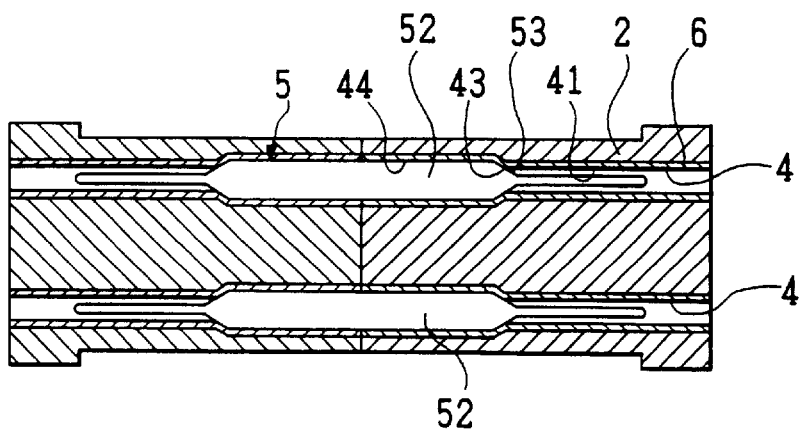
FIG. 9 is a sectional view showing an eighth embodiment of the present invention.

Further, the basic shapes of the guide hole 4 and guide pin 5 in the eighth embodiment of the present invention shown in FIG. 9 are the same as those in the seventh embodiment shown in FIG. 8, except that the guide hole 4 in the eighth embodiment is formed in a ceramic cylindrical member 6 in the same manner as in the third embodiment.

In the sixth and eighth embodiments, the ratio of the length of the maximum portion of the guide pin is in the range of from 20% to 70%, more preferable in the range of from 35% to 65%, based on the whole length of the ferrule.

TEST EXAMPLES

Test Example 1

Optical connector ferrules 2 in FIGS. 2 and 3 were formed through transfer molding with a thermosetting epoxy resin. In the guide hole 4, the minimum inner diameter portion 41, 42 was adjusted to a value so that the insertion force became about 100 g when a 698.5 $\mu$m guide pin which had an outer diameter longitudinally changed was inserted into the guide hole 4. The large diameter portion of the guide hole 4 was made to be about 710 $\mu$m. The length of the minimum inner diameter portion was 2 mm with respect to the whole length 8 mm of the ferrule.

Single mode quartz optical fibers 3 were attached and bonded to 10 pieces of each of the above-mentioned optical connector ferrules, the end surfaces were polished, and then the coupling loss therebetween were evaluated. As a result, the average coupling loss in the configuration shown in FIG. 2 was 0.23 dB, and the average coupling loss in the configuration in which the minimum portion 42 was located on the connector end surface side as shown in FIG. 3 was 0.18 dB.

When coupling losses were evaluated in the same manner as described above by using optical connectors of the conventional configuration each of which had a guide hole not changed in its diameter and a guide pin also not changed in its diameter, as a comparative example, the average coupling loss was 0.32 dB.

Test Example 2

In the same optical connector ferrule 2 as in the test example 1, zirconia cylindrical members 6 having guide holes 4 formed therein were embedded at the time of transfer molding to thereby produce an optical connector of such a configuration as shown in FIG. 4. Incidentally, the size was made identical with that in the test example 1 and the coupling losses between the optical connectors were evaluated. As a result, the average coupling loss was 0.16 dB.

Test Example 3

An optical connector in which the diameter of each of the guide holes was not changed longitudinally was produced. The inner diameter of the guide hole was adjusted to a value so that the insertion force became about 100 g when a 698.5 $\mu$m guide pin was inserted.

By using a guide pin 5 having a large diameter portion (51, 52) of 698.5 $\mu$m and a small diameter portion of 688.5

μm as shown in FIGS. 5 and 6 in this optical connector, the coupling losses between the guide pin and the guide hole were evaluated.

As a result, the average coupling loss in the case of use of the guide pin shown in FIG. 5 was 0.23 dB, and the average coupling loss in the case of use of the guide pin shown in FIG. 6 was 0.19 dB.

Test Example 4

In an optical connector having the configuration in which the diameter of each of the guide holes was changed longitudinally as shown in FIGS. 7 and 8, the guide hole was formed such that the small diameter portion thereof was adjusted to a value so that the insertion force became about 100 g when a 698.5 μm guide pin was inserted into the guide hole while the large diameter portion was adjusted to a value so that insertion force became about 100 g when a 710.0 μm guide pin was inserted into the guide hole.

On the other hand, in the case of the configuration shown in FIG. 7, the small diameter portion (54) and large diameter portion (52) of the guide pin were selected to be 698.5 μmφ and 710 μmφ respectively, and in the case of the configuration shown in FIG. 8, the small diameter portion (54) and large diameter portion of the guide pin were selected to be 688.5 μmφ and 710 μmφ respectively. When the coupling losses between the optical connectors were evaluated, the average coupling loss in the configuration of FIG. 7 was 0.22 dB and the average coupling loss in the configuration of FIG. 8 was 0.17 dB.

Test Example 5

Optical connectors having the configuration of FIG. 9 in which zirconia cylindrical members 6 each having guide holes of the same basic shape and the same size as in FIG. 8 were embedded was produced by trial and the coupling losses between the optical connectors were evaluated in the same manner as described above. As a result, the average coupling loss was 0.15 dB.

As described above, according to the present invention, the variety of the coupling loss between optical connectors at the time of attaching/detaching can be reduced effectively compared with the prior art.

What is claimed is:

1. An optical connector configured to engage with a similar optical connector comprising:

a ferrule having at least one optical fiber and one or more guide holes, said one or more guide holes each having a regular diameter portion extending along a first axial portion thereof and a minimum diameter portion extending along a second axial portion thereof, said one or more guide holes being devoid of threads configured to threadingly engage a guide pin inserted therein, said minimum diameter portion having a substantially constant diameter which is smaller than a diameter of said regular diameter portion;

wherein each of said guide holes is adapted to slidingly receive a guide pin such that said minimum inner diameter portion of each of said one or more guide holes slidingly engages the guide pin received therein in a non-threaded relationship.

2. An optical connector according to claim 1, wherein said minimum inner diameter portion of said guide hole is located on a substantially center portion of said guide hole.

3. An optical connector according to claim 1, wherein said minimum inner diameter portion of said guide hole is located on a side proximal an end surface of said connector.

4. An optical connector according to claim 1, further comprising a metal or ceramic member embedded in said ferrule, said guide holes being formed in said metal or ceramic member.

5. An optical connector according to claim 4, wherein said guide holes are formed in said ceramic member and said ceramic member is formed of zirconia.

6. An optical connector according to claim 1, wherein a ratio of a length of said minimum inner diameter portion to a length of said ferrule is in the range of 20% to 70%.

7. An optical connector according to claim 6, wherein said ratio is in the range of 35% to 65%.

8. An optical connector according to claim 1, wherein said ferrule is made of plastic material.

\* \* \* \* \*